TEMPORARY NOTICE of BEST AVAILABLE IMAGE

U. S. PATENT AND TRADEMARK OFFICE

---

THE SCANNED IMAGES OF PATENT NUMBER

RX 00 0070 FOR THE ISSUE DATE OF

12 / 28 / 1831 ARE NOT THE COMPLETE ORIGINAL

DOCUMENT, BUT CONTAIN A COPY OF THE BEST

AVAILABLE TEXT AND IMAGE DATA FROM VARIOUS

SOURCES.

WHEN THE MISSING INFORMATION BECOMES AVAILABLE,

THE DOCUMENT WILL BE RESCANNED AND REPLACED.

ANY QUESTIONS SHOULD BE DIRECTED TO THE DATA

MAINTENANCE BRANCH BY TELEPHONE AT (703) 306-3116.

---

TEMPORARY NOTICE of BEST AVAILABLE IMAGE

The drawing in this pate
is now in print.

6883X RELATED DOC

UNITED STATES PATENT OFFICE.

HIRAM DEATS, OF QUAKERTOWN, NEW JERSEY, ADMINISTRATOR OF JOHN DEATS, DECEASED.

Rx 70

PLOW.

Specification forming part of Reissued Letters Patent No. 70, dated December 28, 1831.

*To all whom it may concern:*

Be it known that the following is an amended specification or description of certain improvements in the plow made by the late JOHN DEATS, of Roxburg, in the county of Warren and State of New Jersey, and for which he obtained Letters Patent of the United States, dated on the 28th of December, in the year 1831.

In the accompanying drawing Figure 1 is a perspective view of the improved plow on the mold board side. Fig. 2 is a perspective view thereof on the land side. Fig. 3, is a view of the under side of the share and point, separate from the plow, the share and point forming one piece. Fig. 4 is a vertical section from front to back through the iron part of the plow, in the line *x x* of Fig. 3, the beam and other wood-work being omitted; said section passing through the head of the bolt *f*, *f*, that holds the share in place, and passes through the sheath, or standard, *a*, of the plow. Fig. 5 is an inside view of the principal, or main, casting on the land side, being that which is marked B, in Fig. 2, and the inside of which is marked B′. Fig. 6 is a perspective view of the underside of a part of the plow, the sheath and point being removed.

A, A, is the mold board, to which such a curvature is given as appears best calculated to turn the sward with the least resistance; but the main improvement in this part consists in the manner in which it is combined with the land side, and the other parts of the plow. It has a notch, or recess, on its fore-edge (improperly called a dovetail groove in the original specification) the form of which is shown at *g*, Fig. 6; and into this fits the piece *h*, *h*, Fig. 5, which is cast onto the land side piece B, the part *h*, *h*, when in place constituting a part of the face of the land-side, as seen at *h*, *h*, in Fig. 1. The sheath *a* is cast onto the mold-board, and has a tenon *a′*, on it, which enters a mortise in the beam F. The main land side piece, has a projecting piece *i*, Figs. 5 and 6, cast on it, which when connected with the mold board, stands opposite to the part *j*, of the bottom part thereof, as seen in Fig. 6, a space *k*, being left between them into which a wedge is to be driven, which has the effect of uniting these two parts firmly to each other, drawing the piece *h*, *h*, into the recess of the mold-board.

Instead of the straight opening *k*, for the wedge, a semicylindrical cavity may be made in the parts *i* and *j*, as shown by the dotted lines, and a round wedge be driven in between them, which will be covered and kept in place by the share.

The bottom piece *e*, *e*, of the land side, is shown separately in Fig. 7. It consists of an oblong rectangular piece, upon which there is a semicircular tenon, or projecting piece *c*; this tenon enters a corresponding cavity *c′*, formed on the inner side of the land side. A bolt *l*, *l*, is made fast by a screw and nut *m*, to the piece *e*, and passing up through the beam behind the standard, is tightened by a nut *n*. The longitudinal slot *o*, in the main land side piece B, allows the necessary play to the head of the screw *m*. The bottom piece *e*, of the landside is exactly alike on both sides, and is, therefore, reversible, and when one lower angle is worn the other may be turned outward. A strip of metal may also be inserted between it and the main piece B, so as to compensate for wear, or to alter the pitch of the plow, which is of great advantage in different soils.

The cutter *b*, Fig. 2, is exactly alike on both sides, and is reversible; its fore-end is seen at *b*, Fig. 1, projecting in front of the mold board. Its thickness is such as to fit into a rabbet on the main mold board piece B, so as to stand flush with it on the outside, as shown in Fig. 2. The dotted line in Fig. 5 shows the direction of the shoulder of the rabbet, the part above said dotted line forming its inner bearing; *p*, is a mortise through this part, and *q*, *q*, *q*, are holes through the cutter to receive a bolt for fastening it; by means of these several holes, and of the long mortise *p*, the cutter, which forms the whole upper part of the land-side, has great end play, and may be shifted to any desired extent, and entirely obviates the necessity of using a colter. The cutter may be made either of cast or of wrought iron, and in the latter case its edges may be steeled.

The share D, Fig. 3, has a projecting ear *r*, at its hind end, with a bolt hole through it to admit a bolt by which it is secured to the mold-board; the head of this bolt is shown at *s*, Fig. 1. At the hind ear of the share there is a notch, or space *t*, that receives a tongue, or projecting piece *u*, on the lower edge of the main land side piece.

It will be seen that by the several devices above named, the share and the other parts will be permanently held in place; the main bolt *f*, *f*, passing through an iron plate *v*, on the under side of the share, through a corresponding hole in the share, through the hole *w*, Fig. 6, in the mold board and up through the sheath, where it is tightened by a nut, the bolt *s*, and the notch and tongue *t*, and *u*, concurring in keeping the share and point steady.

The clevis E, is arranged differently from those ordinarily used. In the end of the beam there is fixed a piece of cast iron *x*, which is furnished with three or four teeth, as represented; the wrought iron clevis E, is placed at right angles thereto, and by removing the bolt *y*, it may be made to catch into either of the notches of the piece *x*. This piece is allowed to project a little below the lower side of the beam, and may be flush with it at top. The wrought iron clevis E, stands at right angles to this piece, and has three or more projecting teeth *z*, *z*, on it shown in the separate figure E′. The middle tooth of the clevis may be inserted into either of the notches of the piece *x*, to regulate the cutting of the plow. The other notches on the clevis serve to hold the links attached to the whiffle tree and thereby to regulate the lateral draft.

Having thus given a full and exact description of the manner of constructing the plow invented by JOHN DEATS, and shown the operation thereof what is claimed therein as constituting his improvements is—

1. The manner in which the main land side piece B, is combined with the mold board by means of the piece *h*, *h*, cast onto the land side, and fitting into the recess prepared for it on the front edge of the mold board, the two parts being drawn together by means of a wedge entering the space *k*, as set forth.

2. The manner herein set forth of forming and combining the bottom land side piece *e*, *e*, by which form and combination this piece is rendered reversible, and capable of regulating the pitch of the plow, as set forth.

3. The manner of forming and combining the reversible cutter *v*, extending from front to rear of the upper part of the land side, so as to constitute a part thereof, and being capable of being set forward to any required extent, from the manner in which it is connected to the main land-side piece.

4. The manner of confining the combined share and point in place by means of the bolt *f*, *f*, passing up through the sheath, the bolt *s*, and the recess and tongue *t*, *u*.

5. The particular manner of combining the clevis, with the piece *x*, let into the end of the beam so as to operate in the manner described.

HIRAM DEATS,
*Administrator of the estate of John Deats, deceased.*

Witnesses:
THOS. P. JONES,
WM. BISHOP.

[FIRST PRINTED 1911.]